United States Patent
Wu (10) Patent No.: US 11,892,923 B2
(45) Date of Patent: Feb. 6, 2024

(54) TESTING ELECTRONIC PRODUCTS FOR DETERMINING ABNORMALITY

(71) Applicant: TRIPLE WIN TECHNOLOGY (SHENZHEN) CO. LTD., Shenzhen (CN)

(72) Inventor: Jia-Liang Wu, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 27 days.

(21) Appl. No.: 17/854,208

(22) Filed: Jun. 30, 2022

(65) Prior Publication Data
US 2023/0063898 A1  Mar. 2, 2023

(30) Foreign Application Priority Data
Aug. 24, 2021 (CN) .......................... 202110975515.3

(51) Int. Cl.
*G06F 11/22* (2006.01)
(52) U.S. Cl.
CPC .................................. *G06F 11/221* (2013.01)
(58) Field of Classification Search
CPC .................................................... G06F 11/221
See application file for complete search history.

(56) References Cited

U.S. PATENT DOCUMENTS

| | | | | |
|---|---|---|---|---|
| 9,588,859 B2 * | 3/2017 | Wu | ........................ | G06F 11/221 |
| 2011/0056847 A1 * | 3/2011 | Chou | ................. | G01N 27/4165 204/406 |
| 2012/0013346 A1 * | 1/2012 | Xu | ........................ | G06F 11/221 324/543 |
| 2012/0326865 A1 * | 12/2012 | Cao | ........................ | G06F 11/221 702/109 |
| 2013/0111268 A1 * | 5/2013 | Gong | ..................... | G06F 11/221 714/E11.177 |
| 2013/0124763 A1 * | 5/2013 | Kessler | ................ | G06F 11/0754 710/110 |
| 2013/0127447 A1 * | 5/2013 | Pan | ........................ | G06F 11/221 324/160 |
| 2014/0145708 A1 * | 5/2014 | Wu | ........................ | G06F 11/221 324/133 |
| 2017/0185502 A1 * | 6/2017 | Lyer | ....................... | G06F 11/221 |
| 2020/0004656 A1 * | 1/2020 | Ma | ........................... | G06F 13/00 |

FOREIGN PATENT DOCUMENTS

| | | | | |
|---|---|---|---|---|
| CN | 104007340 | | 8/2014 | |
| CN | 112505443 | | 3/2021 | |
| TW | 201723838 A | * | 7/2017 | ....... G01R 31/31705 |
| WO | WO-2020119261 A1 | * | 6/2020 | ........... H04B 10/079 |

* cited by examiner

Primary Examiner — Matthew M Kim
Assistant Examiner — Indranil Chowdhury
(74) Attorney, Agent, or Firm — ScienBiziP, P.C.

(57) ABSTRACT

A method for testing electronic products implemented in an electronic device includes selecting a serial port connected with a slave device in serial communication with a product under test. An activation instruction is transmitted to the slave device, and the electronic product is started through the slave device. Data stored in at least one register of the electronic product and a state of the electronic product is obtained and a capacitance of at least one capacitor in the electronic product is measured. When the electronic product is found to be in an abnormal state, determining a cause of abnormality according to data of the electronic product and the capacitance of the at least one capacitor.

20 Claims, 4 Drawing Sheets

TESTING ELECTRONIC PRODUCTS FOR DETERMINING ABNORMALITY

FIELD

The subject matter herein generally relates to product testing, and particularly to a method for testing electronic products, an electronic device, and a storage medium.

BACKGROUND

In manufacture of electronic products, Failure Analysis Correction Actions (FACA) process is usually required to be performed. The FACA process includes non-destructive analysis such as visual inspection, X-ray inspection, short/open circuit inspection, environmental simulation inspection, etc. In the non-destructive analysis, the product is transported to a production line for testing, so as to read the product information and analyze the state of the product. However, transporting the product requires time and manpower cost.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the words and their equivalents without excluding other elements or articles. The terms "connect", "link" or the like are not limited to physical or mechanical connection, but may include electrical connections, whether direct or indirect.

Figure 1:
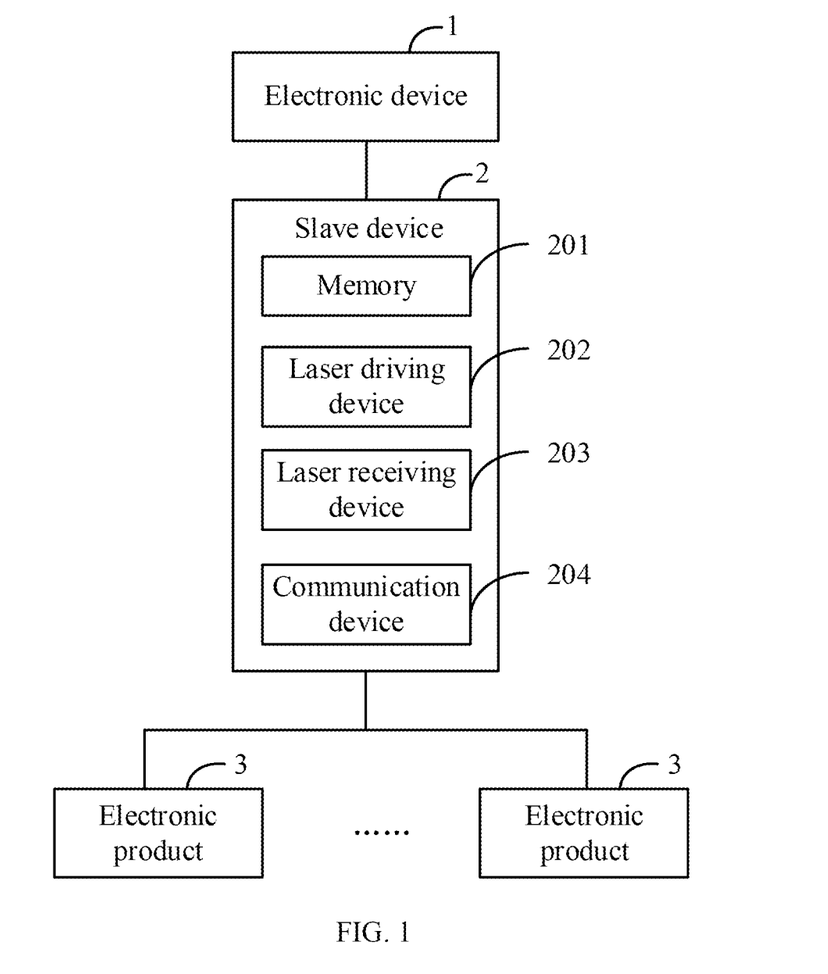
FIG. 1 is a schematic view of an embodiment of an application environment of an electronic device according to the present disclosure.

Referring to FIG. 1, an electronic device 1 is illustrated. In one embodiment, the electronic device 1 communicates with a number of slave devices 2 through a network. The network can be wired network or wireless network, the wireless network can be radio, WI-FI, or cellular network. The cellular network can be a 4G network or a 5G network.

The electronic device 1 may be an electronic device with a test program electronic product installed, the device can be a personal computer, a server, etc., the server may be a single server, a server cluster, or the like.

In one embodiment, the slave device 2 may be an independent STM32 embedded single-chip device, such as a gateway. The slave device 2 includes, but is not limited to, a memory 201, a laser driving device 202, a laser receiving device 203, and a communication device 204. The memory 201 includes a G_800 register and a G_200 register.

The laser driving device 202 and the laser receiving device 203 can be integrated in a laser sensor. The laser driving device 202 is used for driving a laser device. The laser receiving device 203 is used for receiving laser light. The communication device 204 may be a module board that supports serial communication protocols such as RS-232, RS-232C, RS-422A, RS-485, etc., and supports I2C communication, SPI communication, CAN communication and the like. Relative to the slave device 2, the electronic device 1 can be a master device. In other embodiments, the slave device 2 may also be integrated into the electronic device 1.

Figure 2:
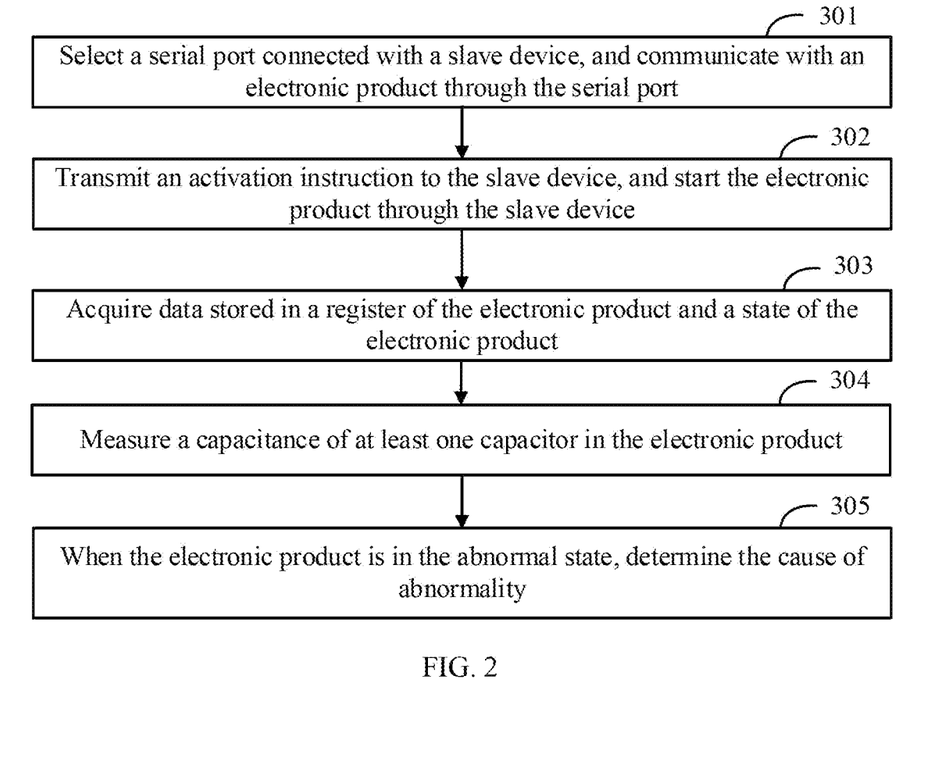
FIG. 2 illustrates a flowchart of an embodiment of a method for testing electronic products according to the present disclosure.

FIG. 2 illustrates a flowchart of an embodiment of a method for testing electronic products. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 301.

At block 301, selecting a serial port connected with a slave device, and communicating with an electronic product through the serial port.

In one embodiment, the slave device 2 is connected with at least one electronic product 3. Serial port communication with a slave device includes: establishing a communication between the electronic device 1 and the slave device 2 through a USB interface, and establishing the slave device 2 and the electronic product 3 through an STM32 interface, thereby establishing the communication between the electronic device 1 and the electronic product 3. In one embodiment, the electronic product 3 can be a camera device, including components such as a lens and an image sensor.

In one embodiment, selecting a serial port connected with the slave device 2 includes: displaying a serial port list by refreshing a plurality of serial ports, and selecting the serial port connected with the slave device 2 from the serial port list in response to a user operation. The serial port may be a USB serial port.

Figure 3:
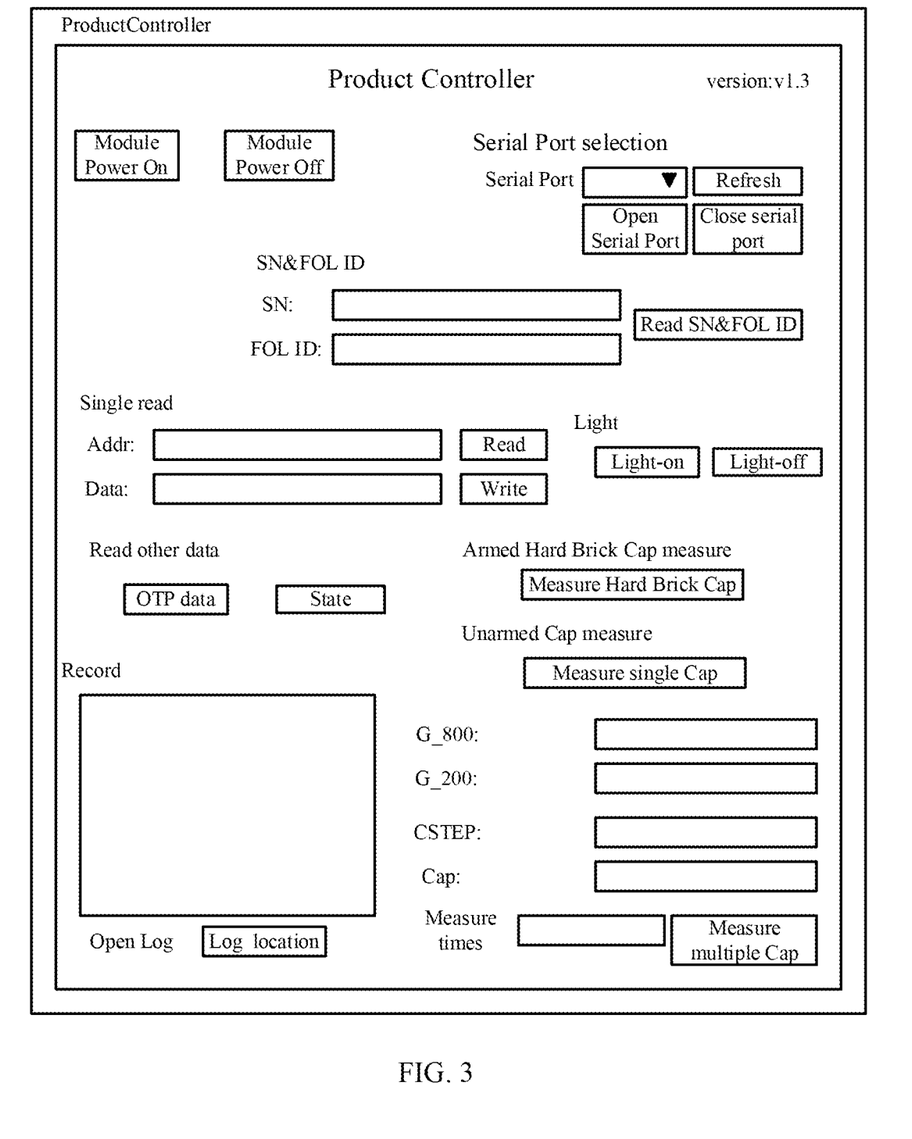
FIG. 3 is a schematic view of an embodiment of an interface of a test program according to the present disclosure.

Referring to FIG. 3, in detail, an electronic product test program (entitled "Product Controller") is running in the electronic device 1. When the electronic product test program is activated, an interface of the electronic product test program is displayed on a display device of the electronic device 1. The user can click the "Refresh" option on the interface of the electronic product test program, the electronic device 1 determines a serial port number of the at least one serial port connected with the slave device 2, and automatically displays the determined serial port number in a first section under "Serial Port" included in a list, the user can select any serial port number by sliding down, and click the "Open Serial Port" option to input a communication instruction. In response to the communication instruction, the electronic device 1 communities with the slave device 2 corresponding to the serial port number.

In one embodiment, the user can click the "Module Power On" option on the interface of the electronic product test program to control the power-on and activation of the slave device 2 which communicates with the electronic device 1, and click the "Close serial port" option to control the electronic device 1 to disconnect the slave device 2.

It can be understood that, the slave device 2 communicates with the electronic product 3 through an STM32 interface, and the manner of connection is simple and easy to implement. Even if the electronic product 3 is in a non-destructive test, the product information can also be transmitted to the slave device 2, thereby obtaining the product information while performing the non-destructive analysis, so as to test and analyze the electronic product 3 in real time based on the product information, thereby improving the test accuracy.

At block 302, transmitting an activation instruction to the slave device, and starting the electronic product through the slave device.

In one embodiment, the electronic device 1 generates a current signal based on a preset current as the activation instruction, and transmits the activation instruction to the slave device 2, and controls the slave device 2 to activate the electronic product 3.

In detail, the user can click the "Light-on" option on the interface of the electronic product test program, in response to the user operation, the electronic device 1 transmits the activation instruction to the slave device 2, and the slave device 2 transmits the activation instruction to the electronic product 3 by a STM32 signal, so as to activate the electronic product 3. The user can also click the "Light-off" option on the interface of the electronic product test program, in response to the user operation, the electronic device 1 transmits a shutdown instruction to the slave device 2, and the slave device 2 transmits the shutdown instruction to the electronic product 3 by the STM32 signal, so as to turn off the electronic product 3.

At block 303, obtaining data stored in at least one register of the electronic product and a state of the electronic product.

In one embodiment, the data stored in at least one register of the electronic product includes operation data generated during the operation of the electronic product 3 and One Time Programmable (OTP) data. The operation data includes, but is not limited to, state data and circuit parameters of the electronic product 3, the state data includes temperature etc., the circuit parameters include voltage, current, capacitance etc. The state of the electronic product 3 can be normal state or abnormal state. The state of the electronic product 3 can be determined according to a result of the non-destructive test.

For example, if the electronic product 3 is a camera module, the normal state indicates that the function of the camera module is normal, for example, such electronic device can frame, focus, adjust exposure parameters, and correct the image etc. The abnormal state indicates that at least one function of the camera module is not working or is malfunctioning. As illustrated FIG. 3, the normal state of the electronic product 3 is represented by "Armed", and the abnormal state is represented by "Unarmed".

In one embodiment, the OTP data includes, but is not limited to, test data of the electronic product 3 in the production process and product data provided by a supplier of the electronic product 3. The test data in the production process can also include temperature, voltage, current, capacitance, etc. The product data can include a software version number, a hardware version number, and lens parameters of the camera module (such as correction parameters, white balance parameters, focus parameters, etc.).

In detail, the user can click the "OTP data" option on the interface of the electronic product test program, the slave device 2 is controlled by the electronic device to obtain the OTP data of the electronic product 3. The user can also click the "State" option on the interface of the electronic product test program, the slave device 2 is controlled by the electronic device to obtain the state of the electronic product 3.

In one embodiment, the user can input the address of the register in the "Addr" field in "Single Read" on the interface of the electronic product test program, and click the "Read" option, the slave device 2 is controlled by the electronic device to obtain the data recorded in at least one register of the electronic product corresponding to the register address. The user can also input the data function code in the "Data" field in "Single Read" on the interface of the electronic product test program, and click the "Write" option, the slave device 2 is controlled by the electronic device to obtain the data corresponding to the data function code from the at least one register of the electronic product 3. The register address and the data function code can both be hexadecimal numbers. For example, the data function code includes data of lens parameters.

In one embodiment, the slave device 2 obtains the data and state stored by the electronic product 3 through an I2C bus, and feeds the obtain data and state stored in the electronic product 3 to the electronic device 1 back. It should be noted that, the data and state stored by the electronic product 3 fed back by the slave device 2 are displayed in the "Record" column on the interface of the electronic product test program, which facilitates the viewing of the user.

The user can also click the "Log location" option on the interface of the electronic product test program, the slave device 2 is controlled by the electronic device to generate a log, and the log is fed back to the electronic device 1, the electronic device 1 displays the log in a form of a pop-up window.

At block 304, measuring a capacitance of at least one capacitor in the electronic product.

In one embodiment, a plurality of capacitors are included in circuits and chips of the electronic product 3. Measuring the capacitance of at least one capacitor in the electronic product 3 includes: measuring voltage of the at least one capacitor, calculating a capacitance step size of the at least one capacitor according to the voltage and a preset parameter, and calculating the capacitance of the at least one capacitor according to the capacitance step size and the number of preset step sizes.

In one embodiment, the preset parameters include fixed value parameters and scan parameters. In detail, an intermediate value is calculated according to the voltage and the fixed value parameter, the capacitance step size of the at least one capacitor is calculated based on the intermediate value and the scanning parameter, and the capacitance of the at least one capacitor is calculated according to the capacitance step size and the number of step sizes.

In detail, the slave device 2 measures the voltage of the at least one capacitor through a 10-bit Analog to Digital Converter (ADC), converts the measured voltage into two hexadecimal numbers, and stores the two hexadecimal numbers in the G_800 and G_200 registers of the slave device 2, respectively. The capacitance step size CSTEP of the capacitor is calculated based on a voltage value recorded in the G_800 register and a voltage value recorded in the G_200 register, then the number of the step sizes n of the capacitor is obtained from the register of the electronic product 3, and the capacitance Cap of the capacitor is calculated according to Cap=n*CSTEP.

For example, if the electronic product 3 is in a normal state, the user can click the "Measure Hard Brick Cap" option on the interface of the electronic product test program, a capacitance measurement instruction is transmitted to the slave device 2. In response to such instruction, the slave device 2 feeds the two hexadecimal numbers of the measured voltage and the number of step sizes n recorded in the register back to the electronic device 1, and electronic device 1 calculates the capacitance Cap based on two hexadecimal numbers of voltage and the number of step sizes n. In the boxes "CSTEP", "Cap", "G_800", and "G_200" on the interface of electronic product test program, data is automatically inserted.

The user can input the address of register of the electronic product 3 in which the number of the step sizes n is recorded in the "Addr" field on the interface of the electronic product test program, the slave device 2 is controlled by the electronic device to obtain the number of the step sizes n from the register of the electronic product 3, and feed the number of the step sizes n back to the electronic device 1. In one embodiment, the capacitance of capacitors of electronic product 3 in the normal state can be used to correct a standard range of the capacitance.

If the electronic product 3 is in an abnormal state, the user can click "Measure Single Cap" on the interface of the electronic product test program, and the slave device 2 feeds the two hexadecimal numbers of the voltage and the number of step sizes n recorded in the register back to the electronic device 1. The electronic device 1 calculates the capacitance Cap of the capacitor based on the two hexadecimal numbers of voltage and the number of the step sizes n, and the corresponding data is automatically filled and viewable in the fields of "G_800", "G_200", "CSTEP", and "Cap" on the interface of the electronic product test program.

The user can also input a value of the measurement times of in the "measurement times" field, and click the "measure multiple Cap" option, so as to measure the capacitance of the at least one capacitor multiple times, thereby reducing measurement errors.

At block 305, when the electronic product is in the abnormal state, determining the cause of abnormality according to the data of the electronic product and the capacitance of the at least one capacitor.

In one embodiment, determining the cause of abnormality according to the data and capacitance of the electronic product includes: obtaining a standard range of capacitance from the data stored in the electronic product 3, and determining whether the capacitance is in the standard range. When the capacitance is not in the standard range, the cause of abnormality is determined as being abnormality of the circuit or chip where the capacitor corresponding to the capacitance is located.

In one embodiment, when the capacitance is in the standard range, it indicates that the circuit or chip where the capacitor is located is normal. Other data (e.g., the operation data and state data) and a corresponding standard range from the data stored in the memory 201 can be obtained, and other data compared with the corresponding standard range, to determine the cause of abnormality of the electronic product 3.

For example, the other data may be temperature data, and the temperature data is compared with a standard temperature range. When the temperature data is not in the standard temperature range, the cause of abnormality of the electronic product 3 is determined to be the abnormal temperature.

In one embodiment, when the cause of abnormality cannot be determined after comparing other data with the corresponding standard range, prompt information is output to remind the user to manually confirm the cause of abnormality.

Further, the method includes: when the communication is established between the electronic device 1 and the slave device 2, obtaining the serial number (SN) and production stage number (FOL ID) of the product 3, and associating the serial number and the production stage number with and with the data stored in the register of the electronic product 3.

The user can click the "Read SN and FOL ID" option on the interface of the electronic product test program, the slave device 2 is controlled to obtain the serial number and production stage number of the electronic product 3, and feed the serial number and production stage number back to the electronic device 1, and the electronic device 1 fills the serial number and the production stage number into the "SN code" field and the "FOL ID" field, respectively, for viewing by the user.

Further, the method includes: driving the electronic product 3 to emit laser light by transmitting a driving signal to the electronic product 3 through the laser driving device 202, and testing a laser scanning function of the electronic product 3 according to the laser light emitted by the electronic product 3.

In detail, testing a laser scanning function of the electronic product 3 according to the laser light emitted by the electronic product 3 includes: detecting whether the electronic product 3 has emitted laser light normally. If it is determined that the electronic product 3 has emitted laser light normally, it is determined that the laser scanning function of the electronic product 3 is normal. If it is determined that the electronic product 3 has not emitted laser normally, it is determined that the laser scanning function of the electronic product 3 is abnormal or malfunctioning.

For example, the laser receiving device 203 receives the laser light emitted by the electronic product 3, if the laser receiving device 203 has received the laser light emitted by the electronic product 3, it is determined that the electronic product 3 has emitted laser light normally. If the laser receiving device 203 has not received the laser light emitted by the electronic product 3, it is determined that the laser light of the electronic product 3 has not emitted normally, further, it is determined that the laser scanning function of the electronic product 3 is abnormal or malfunctioning.

In other embodiments, the laser driving device 202 drives the electronic product 3 to emit laser light to a target object by transmitting a scanning signal to the electronic product 3. If the electronic product 3 has emitted laser light normally, further determining whether the electronic product 3 receives reflected laser light.

If it is determined that the electronic product 3 has received the reflected laser light, obtaining a contour of the target object formed based on the emitted laser light, the reflected laser light, and a principle of distance measurement of laser, and comparing the contour with a preset contour of the target object. If the contour and the preset contour of the target object have sufficient similarity, that is, the similarity between the contour and the preset contour is greater than or equal to a preset percentage (e.g., 90%), it is determined that the laser scanning function of the electronic product 3 is normal. If it is determined that the laser receiving device has not received the emitted laser light, or it is determined that the similarity between the contour and the preset contour of the target object is less than the preset percentage, it is determined that the laser scanning function of the electronic product 3 fails the test, that is, the laser scanning function of the electronic product 3 is abnormal or malfunctioning. The target object can be a human face or other object with a contour.

In on embodiment, obtaining a contour of the target object formed based on the emitted laser light, the reflected laser light, and a principle of distance measurement of laser includes: scanning the target object by continuously emitting the laser light to the target object, receiving the reflected laser light, and forming the contour of the target object based on the emitted laser light, the reflected laser light, and a principle of distance measurement of laser.

The method for testing the electronic product is realized by communicating with the electronic product to be tested through the slave device, the communication method is simple and provides convenient product information transmission, the product information can be easily obtained, and the electronic product can be tested during the non-destructive test of the electronic product, there is no need to transport the electronic product to a production line, thereby reducing the time cost and labor cost of product test and improving product test efficiency.

Figure 4:
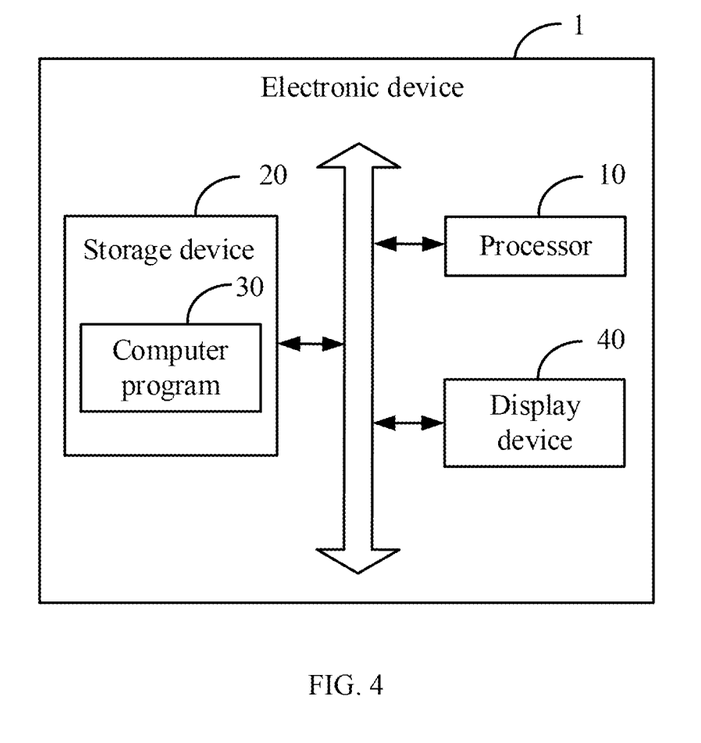
FIG. 4 is a block diagram of an embodiment of an electronic device according to the present disclosure.

FIG. 4 illustrates the electronic device 1 in one embodiment. The electronic device 1 includes, but is not limited to, a processor 10, a storage device 20, a computer program 30, and a display device 40. FIG. 4 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The storage device 20 stores instructions, the processor 10 executes the computer program 30 stored in the storage device 20 for implementing the method for testing electronic products provided in the embodiments of the present disclosure. The computer program 30 is a test program of an electronic product and includes instructions.

The processor 10 is configured to:
select a serial port connected with a slave device, and communicating with an electronic product through the serial port;
transmit an activation instruction to the slave device, and starting the electronic product through the slave device;
obtain data stored in the register of the electronic product and the state of the electronic product;
measure a capacitance of at least one capacitor in the electronic product;
when the electronic product is in the abnormal state, determine the cause of abnormality according to the data of the electronic product and the capacitance of the at least one capacitor.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
select a serial port connected with a slave device, and communicate with an electronic product through the serial port;
transmit an activation instruction to the slave device, and start the electronic product through the slave device;
obtain data stored in at least one register of the electronic product and a state of the electronic product;
measure a capacitance of at least one capacitor in the electronic product; and
in response that the electronic product is in an abnormal state, determine a cause of abnormality according to obtained data of the electronic product and the capacitance of the at least one capacitor.

2. The electronic device according to claim 1, wherein the at least one processor is further caused to:
display a serial port list by refreshing a plurality of serial ports; and
select the serial port connected with the slave device from the serial port list in response to a user operation.

3. The electronic device according to claim 2, wherein the at least one processor is further caused to:
establish a communication between the electronic device and the slave device through a Universal Serial Bus (USB) interface; and
establish the communication between the electronic device and the electronic product by establishing a communication between the slave device and the electronic product through an STM32 interface.

4. The electronic device according to claim 3, wherein the at least one processor is further caused to:
in response that the communication is established between the electronic device and the slave device, obtain a serial number and a production stage number of the electronic product; and associate the serial number and the production stage number with the obtained data stored in the at least one register of the electronic product.

5. The electronic device according to claim 1, wherein the data stored in the at least one register comprises operation data and one time programmable data of the electronic product, and the state of the electronic product comprises a normal state or an abnormal state.

6. The electronic device according to claim 1, wherein the at least one processor is further caused to:
drive the electronic product to emit laser light by transmitting a driving signal to the electronic product; and
test a laser scanning function of the electronic product according to the laser light emitted by the electronic product.

7. The electronic device according to claim 1, wherein the at least one processor is further caused to:
measure voltage of the at least one capacitor;
calculate a capacitance step size of the at least one capacitor according to the voltage and preset parameters; and
calculate the capacitance of the at least one capacitor according to the capacitance step size and a number of preset step sizes.

8. The electronic device according to claim 1, wherein the at least one processor is further caused to:
obtain a standard range of the capacitance from the data stored in the electronic product;
determine whether the capacitance is in the standard range; and
in response that the capacitor is not in the standard range, determine that the cause of abnormality is abnormality of a circuit or a chip where the capacitor corresponding to the capacitance is located.

9. A method for testing electronic products implemented in an electronic device comprising:
selecting a serial port connected with a slave device, and communicating with an electronic product through the serial port;
transmitting an activation instruction to the slave device, and starting the electronic product through the slave device;
obtaining data stored in at least one register of the electronic product and a state of the electronic product;
measuring a capacitance of at least one capacitor in the electronic product; and
in response that the electronic product is in an abnormal state, determining a cause of abnormality according to obtained data of the electronic product and the capacitance of the at least one capacitor.

10. The method according to claim 9, wherein selecting the serial port connected with the slave device comprises:
displaying a serial port list by refreshing a plurality of serial ports; and
selecting the serial port connected with the slave device from the serial port list in response to a user operation.

11. The method according to claim 10, wherein communicating with the electronic product through the serial port comprises:
establishing a communication between the electronic device and the slave device through a Universal Serial Bus (USB) interface; and
establishing the communication between the electronic device and the electronic product by establishing a communication between the slave device and the electronic product through an STM32 interface.

12. The method according to claim 11, further comprising:
in response that the communication is established between the electronic device and the slave device, obtaining a serial number and a production stage number of the electronic product; and
associating the serial number and the production stage number with the obtained data stored in the at least one register of the electronic product.

13. The method according to claim 9, wherein the data stored in the at least one register comprises operation data and one time programmable data of the electronic product, and the state of the electronic product comprises a normal state and an abnormal state.

14. The method according to claim 9, further comprising:
driving the electronic product to emit laser light by transmitting a driving signal to the electronic product; and
testing a laser scanning function of the electronic product according to the laser light emitted by the electronic product.

15. The method according to claim 9, wherein measuring the capacitance of the at least one capacitor in the electronic product comprises:
measuring voltage of the at least one capacitor;
calculating a capacitance step size of the at least one capacitor according to the voltage and preset parameters; and
calculating the capacitance of the at least one capacitor according to the capacitance step size and a number of preset step sizes.

16. The method according to claim 9, wherein determining the cause of abnormality according to obtained data of the electronic product and the capacitance of the at least one capacitor comprises:
obtaining a standard range of the capacitance from the data stored in the electronic product;
determining whether the capacitance is in the standard range; and
in response that the capacitor is not in the standard range, determining that the cause of abnormality is abnormality of a circuit or a chip where the capacitor corresponding to the capacitance is located.

17. A non-transitory computer-readable storage medium having instructions stored thereon, when the instructions are executed by a processor of an electronic device, the processor is configured to perform a method for testing electronic products, wherein the method comprises:
selecting a serial port connected with a slave device, and communicating with an electronic product through the serial port;
transmitting an activation instruction to the slave device, and starting the electronic product through the slave device;
obtaining data stored in at least one register of the electronic product and a state of the electronic product;
measuring a capacitance of at least one capacitor in the electronic product; and
in response that the electronic product is in an abnormal state, determining a cause of abnormality according to obtained data of the electronic product and the capacitance of the at least one capacitor.

18. The non-transitory computer-readable storage medium according to claim 17, wherein the method further comprises:

driving the electronic product to emit laser light by transmitting a driving signal to the electronic product; and testing a laser scanning function of the electronic product according to the laser light emitted by the electronic product.

19. The non-transitory computer-readable storage medium according to claim 17, wherein measuring the capacitance of the at least one capacitor in the electronic product comprises:

measuring voltage of the at least one capacitor;

calculating a capacitance step size of the at least one capacitor according to the voltage and preset parameters; and calculating the capacitance of the at least one capacitor according to the capacitance step size and a number of preset step sizes.

20. The non-transitory computer-readable storage medium according to claim 17, wherein determining the cause of abnormality according to the obtained data of the electronic product and the capacitance of the at least one capacitor comprises:

obtaining a standard range of the capacitance from the data stored in the electronic product;

determining whether the capacitance is in the standard range; and in response that the capacitor is not in the standard range, determining that the cause of abnormality is abnormality of a circuit or a chip where the capacitor corresponding to the capacitance is located.

\* \* \* \* \*